US008811896B2

(12) United States Patent
Katz et al.

(10) Patent No.: US 8,811,896 B2
(45) Date of Patent: Aug. 19, 2014

(54) NON-VOLATILE MEMORY FOR CONTACTLESS SYSTEMS

(75) Inventors: Ran Katz, Givatayim (IL); Koby Levy, Bat-Yam (IL); Tally Mane, Petah Tikva (IL)

(73) Assignee: Texas Instruments Incorporated, Dallas, TX (US)

( * ) Notice: Subject to any disclaimer, the term of this patent is extended or adjusted under 35 U.S.C. 154(b) by 192 days.

(21) Appl. No.: 13/343,770

(22) Filed: Jan. 5, 2012

(65) Prior Publication Data
US 2012/0178365 A1    Jul. 12, 2012

Related U.S. Application Data

(60) Provisional application No. 61/430,784, filed on Jan. 7, 2011.

(51) Int. Cl.
H04B 5/00    (2006.01)

(52) U.S. Cl.
USPC ....................................................... 455/41.1

(58) Field of Classification Search
USPC .................................... 455/41.1, 41.2
See application file for complete search history.

(56) References Cited

U.S. PATENT DOCUMENTS 7,825,776 B2 * 11/2010 Smith et al. ............... 340/10.51
8,117,445 B2 * 2/2012 Werner et al. ................. 713/168
8,330,581 B2 * 12/2012 Akiyama et al. ............. 340/10.2
8,478,196 B1 * 7/2013 Hewinson .................. 455/41.1
2009/0312011 A1 * 12/2009 Huomo et al. .............. 455/426.1
2011/0163855 A1 * 7/2011 Takeuchi ..................... 340/10.3
2012/0169476 A1 * 7/2012 Ota et al. ..................... 340/10.5
2014/0066102 A1 * 3/2014 Kuwahara et al. .......... 455/456.3

OTHER PUBLICATIONS

"Requirements for Single Wire Protocol NFC Handsets", GSM Association, Pay-Buy-Mobile Initiative, Version 4.0, pp. 1-21, Mar. 2011.
"The role of SIM OTA and the Mobile Operator in the NFC environment", SmartTrust, pp. 1-12, Apr. 2009.

* cited by examiner

Primary Examiner — Andrew Wendell
Assistant Examiner — Maryam Soltanzadeh
(74) Attorney, Agent, or Firm — Ronald O. Neerings; Frederick J. Telecky, Jr.

(57) ABSTRACT

A contactless system is described in which energy is scavenged from an electromagnetic field provided by a proximate reader device. An embedded processor and a volatile memory circuit within a near field communication (NFC) controller are operated using the scavenged energy. Parameter data from the proximate reader device may be acquired while conducting a near field communication transaction. A non-volatile memory (NVRAM) server is coupled to the NFC controller and also operates using the scavenged energy. Parameter data may be stored within the NVRAM server by sending a command and the parameter data from the NFC controller to the NVRAM server. At the completion of the transaction, the electromagnet field may be removed and all parameter data stored within the NFC controller will be lost. However, the next time the electromagnetic field is applied, the NFC controller may retrieve the parameters from the NVRAM server by sending a command.

13 Claims, 7 Drawing Sheets

US 8,811,896 B2

NON-VOLATILE MEMORY FOR CONTACTLESS SYSTEMS

CLAIM OF PRIORITY UNDER 35 U.S.C. 119 ((A) FOREIGN, (E) PROVISIONAL)

The present application claims priority to and incorporates by reference U.S. Provisional Application No. 61/430,784, filed Jan. 7, 2011, entitled "Non-Volatile Memory Solution for Contactless Systems."

FIELD OF THE INVENTION

This invention generally relates to use of a near field communication controller within a mobile or a portable device, such as a cell phone or a laptop/tablet computer.

BACKGROUND OF THE INVENTION

Near Field Communication (NFC) is a wireless technology allowing two devices to communicate over a short distance of approximately 10 cm or less. NFC is standardized internationally within NFC Forum specifications and defined in ISO/IEC 18092, ECMA-340, and ISO 14443, for example. NFC allows a mobile handset to interact with a subscriber's immediate environment. With close-range contactless technology, mobile handsets may be used as credit cards, to access public transportation, to access secured locations, and many more applications.

A chip in the handset may perform the wireless near field communication to an adjacent reader, smart card, or other handset. The display, keyboard, and the mobile network capability of the handset enable the implementation of a wide range of powerful applications. To protect the consumer, some of these applications must be securely deployed and managed regardless of where the subscriber is and the time of day. The UICC (universal integrated circuit card), also referred to as USIM (universal subscriber identity module), is a secure environment for deploying these applications. An embedded secure environment chip may also be provided by some handsets.

A subscriber identity module (SIM) is an integrated circuit that securely stores its unique serial number (ICCID), an International Mobile Subscriber Identity (IMSI) and the related key used to identify and authenticate subscriber on mobile telephony devices such as mobile phones and computers. A SIM also contains temporary information related to the local network, a list of the services to which the user has access, and passwords.

USIM (Universal Subscriber Identity Module) is an application for UMTS mobile telephony running on a UICC smart card which is inserted in a 3G mobile phone. There is a common misconception to call the UICC itself a USIM, but the USIM is merely a logical entity on the physical card. It stores user subscriber information, authentication information and provides storage space for text messages and phone book contacts. The phone book on a UICC has been greatly enhanced. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The capabilities of a UICC have been skyrocketing in the last few years, with fast processors and multi-megabyte capacities squeezed into the diminutive package. A UICC card is typically connected to a host processing module on a handset using an ISO 7816 (Industry Standards Organization) protocol; while a UICC may also include a fast, universal serial bus (USB) interface. The adoption of USB leaves one pin free on the UICC package, and it is over this single wire that the USIM can communicate with NFC hardware on the handset. Alternatively, other pins may be used, such as "programming voltage VPP" pin C6 that is available regardless of USB use. The Single Wire Protocol (SWP) for this purpose has been approved as a standard by the European Technical Standards Institute (ETSI) as TS 301 613.

Various systems may also include an embedded security element that includes a processor and memory. The embedded security element may include a secure operating system that allows the execution of various applications within the security element. Currently, vendors such as Gemalto and Giesecke & Devrient provide secure operating systems for use on embedded security elements. The embedded security element will have an interface to communicate with the NFC hardware, this interface may be SWP compliant or some vendor specific protocol.

BRIEF DESCRIPTION OF THE DRAWINGS

Particular embodiments in accordance with the invention will now be described, by way of example only, and with reference to the accompanying drawings.

Figure 1:
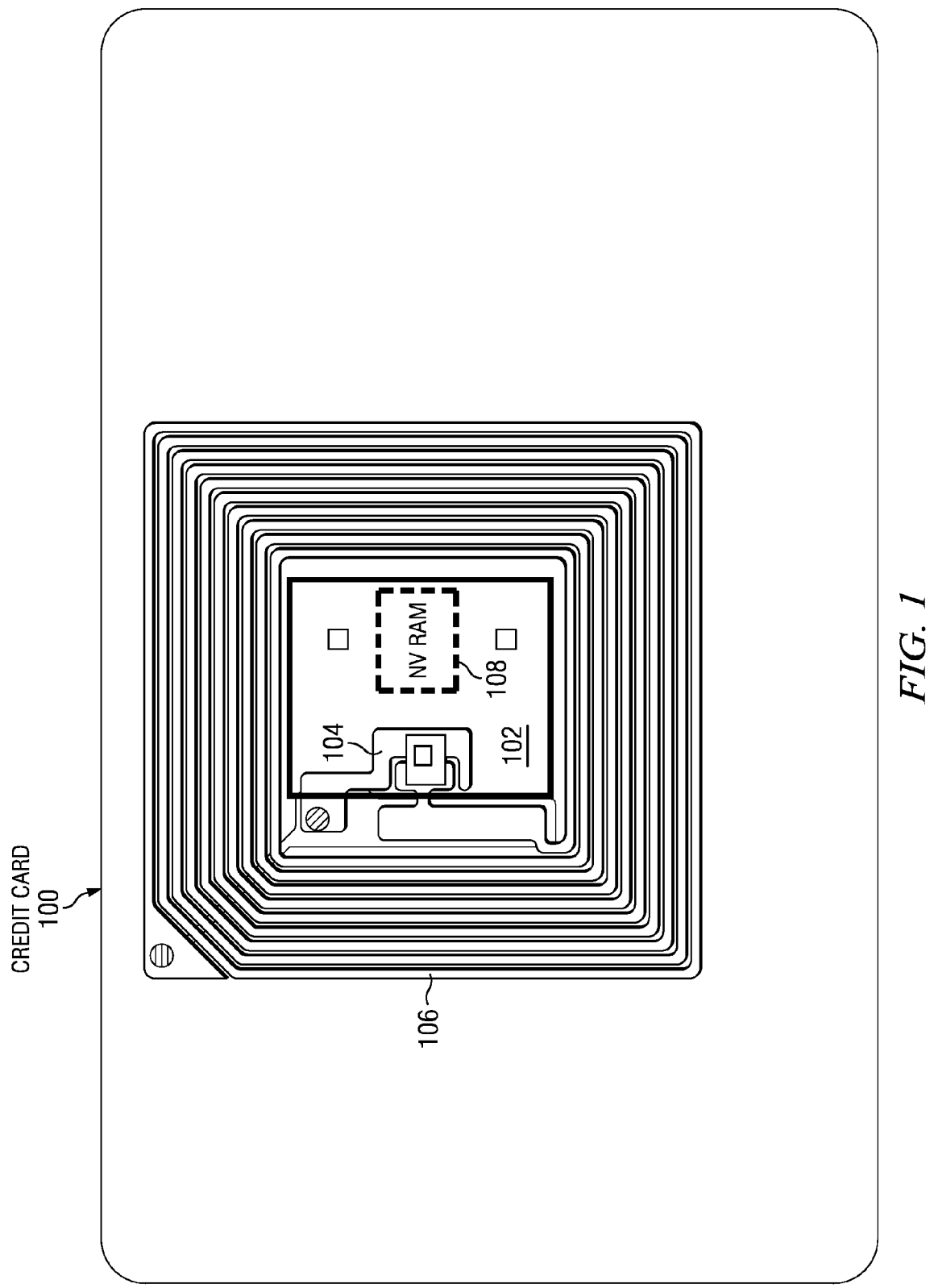
FIG. 1 is an illustration of a contactless device.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A near field communication (NFC) controller needs access to a block of non-volatile memory to hold various parameters used in each communication protocol supported by the NFC controller. A solution for non-volatile memory for use by a NFC controller in contactless systems based on use of non-volatile memory embedded within an adjacent device is described herein. The adjacent device may be either an embedded security device or a UICC/SIM, for example. The term "contactless system" in this document is intended to cover any contactless system, such as NFC, ISO14443, ISO 15693 (proximity cards), any "RFID" (radio frequency identification) system etc., that requires a contactless controller to have information stored in a non volatile memory.

Contactless systems have been around for a while, and are common as access control ID's (e.g. employee badges), as well as payment systems for public transportation etc. More recently, credit cards are beginning to include NFC capability. Lately, contactless capabilities are being integrated into mobile phones as well, recent examples are Nokia's 6212 phone and Google's Android, which supported NFC in its latest release.

A key difference between the implementation of the stand-alone contactless cards described above and implementation of a mobile phone contactless system is the manufacturing process and its capabilities used to produce the contactless controller used in a mobile handset. The stand-alone contactless cards usually contain a contactless controller manufactured in an "analog friendly" process that produces relatively large size transistors in which non-volatile memory is common and cheap. However, most of the contactless controllers for mobile handsets will be manufactured in a deep sub-micron CMOS process so that they can be easily integrated with other modules in the handset, such as WLAN (wireless local area network), Bluetooth, etc., for size reduction and platform optimization. One draw back of these advanced processes is the lack, or high cost, of non-volatile memory space.

In order to enable low or no battery operation there is a requirement to store information in a non-volatile manner. This information may include parameters defining the "tag" configuration, for example. Low or no battery operation is required to allow a user to still have access to credit cards, access codes, transportation tokens, etc, even if the battery in their mobile handset has been depleted or even removed.

A simple but costly solution in terms of price and system size would be to connect an external non-volatile memory device such as an EEPROM (electrically erasable programmable read only memory), etc. to a NFC controller. This would require an extra component and additional space on the substrate or circuit board to which the NFC controller is mounted.

The phone processor may be connected to a large non-volatile memory, such as a very large flash memory. However, since some of the NFC applications may be required to operate when the battery is mostly or completely depleted", e.g. for transportation ticketing, small credit card payments etc., the processor and processor's memory would not be available for use by the NFC while the battery is low or dead.

A better solution is to provide NVRAM (non-volatile random access memory) service to the contactless controller from another device that is already present within the mobile handset and operational in the same usage scenarios. The mobile handset may also contain a security device that may be either an embedded security element (SE) or the UICC, or both, that is connected to the NFC controller. The security device is also active when contactless activities occur since it is required for many contactless use cases, including payment and access control. These security devices contain a relatively large amount of non-volatile memory and are capable of running various applications, also referred to as applets.

An embodiment of the invention may use the security device as a non volatile memory "service provider" by having a specific non-volatile applet on the security device either as part of the operating system installed by the phone manufacturer on the embedded security device, or by the phone service provider on the UICC/SIM. This saves both the cost and effort of adding a specific non-volatile memory device. A standardized and simple API (application programming interface) may be provided to support the NVRAM service over an existing interface between the security device and the contactless controller, such as SWP (single wire protocol), etc.

The non-volatile memory service may also be secured, if required, by employing an authentication scheme on power-up events, for example, in order to maintain the secure environment of the embedded security element and/or the UICC.

The non-volatile memory service may support the following API commands:
 Read_memory(address, size)—to read data from the memory
 Write_memory(address, size, data)—to write data into the memory
 Get_memory_size( )—returns the amount of allocated memory for the service
Additional API commands may be provided if needed for a particular communication protocol.

The SIM card memory was previously only used for the "on-board" SIM applications and services, such as phone book info. This on-board service is defined by standardized SIM toolkit specifications and managed by a SIM application. API's are provided that enable the mobile handset's processor to use this service. However, since some NFC applications must work while the battery is low or dead, accessing the SIM using API by the host processor is not feasible.

Conversely, embodiments of the invention request direct and simple memory access between the NFC controller and the security element. Configuring the UICC/SIM/secure element to act as an NVRAM server provides an elegant solution, since the UICC/SIM secure element is required to be operating in these cases as well.

FIG. 1 is an illustration of a contactless device 100, which in this example is representative of a credit card. A small integrated circuit 102 includes a capacitor 104 that is coupled to coil 106. Proximity cards as well as vicinity cards are powered by resonant inductive coupling via an LC circuit including capacitor 104 and coil 102 that are connected in parallel. When the card is placed in proximity to a card reader, the card reader produces an electromagnetic field that excites the coil and resonant current charges the capacitor, which in turn energizes and powers IC 102. IC 102 may also include a simple processor with application software stored in read only memory. IC 102 may also include a small amount of non-volatile RAM 108 that is used to store parameters while the card is processing a transaction while powered by a nearby card reader.

NFC is a set of short-range wireless technologies, typically requiring a distance of 4 cm or less. Some NFC embodiments operate at 13.56 MHz on ISO/IEC 18000-3 air interface and at rates ranging from 106 kbit/s to 424 kbit/s, for example. Other embodiments may be based on existing radio-frequency identification (RFID) contactless standards including ISO/IEC 14443 and FeliCa, for example. Embodiments may also utilize later developed standards for contactless communication. NFC always involves an initiator and a target; the initiator actively generates an RF field that can power a passive target. This enables NFC targets to take very simple form factors such as tags, stickers, key fobs, or cards that do not require batteries. NFC peer-to-peer communication is possible, provided both devices are powered. NFC tags contain data and are typically read-only but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. The NFC Forum defines four types of tags which provide different communication speeds and capabilities in terms of configurability, memory, security, data retention and write endurance. Tags currently offer between 96 and 4,096 bytes of memory.

As mentioned above, stand-alone contactless cards usually contain a contactless controller manufactured in an "analog friendly" process that produces relatively large size transistors in which non-volatile memory is common and cheap.

Figure 2:
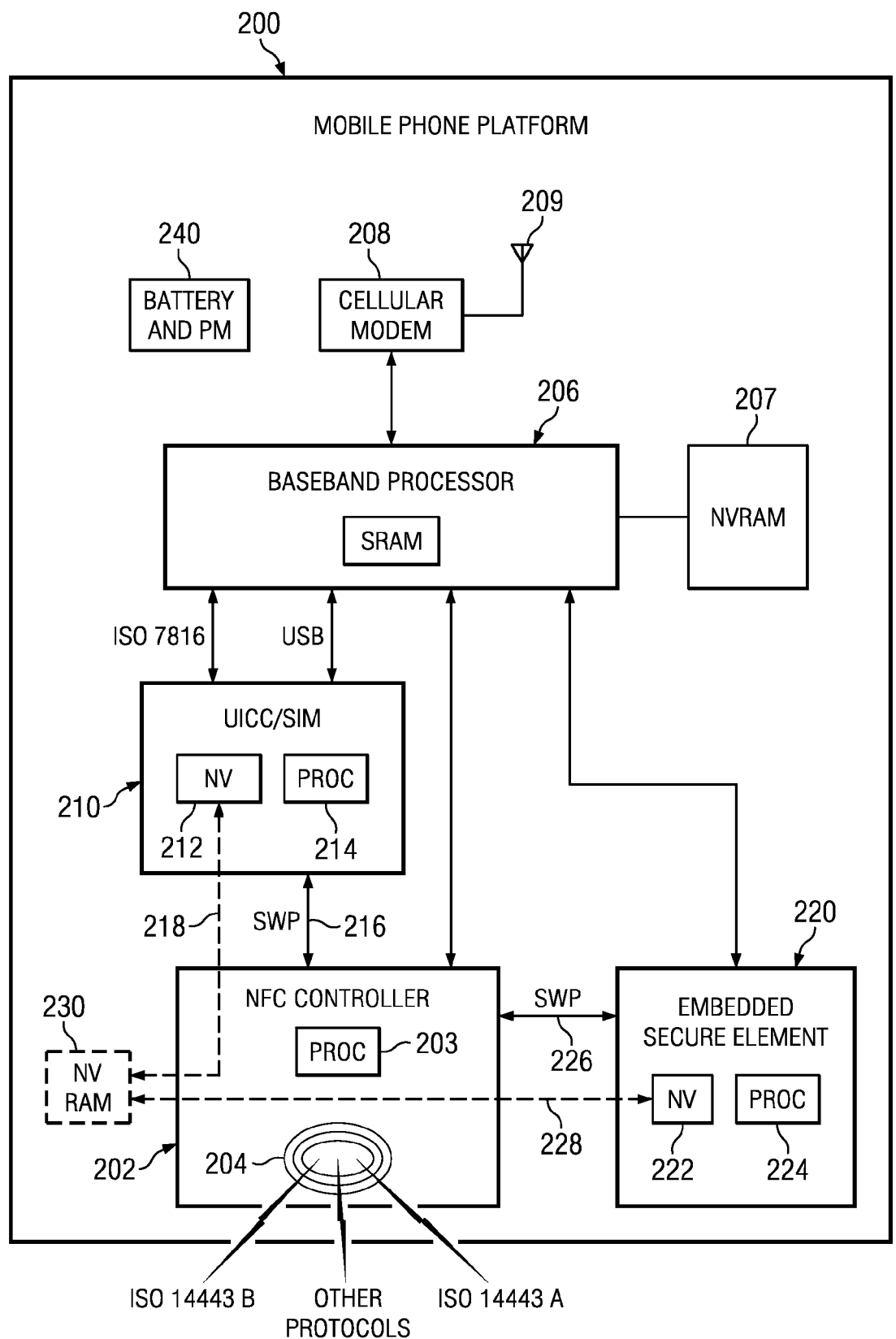
FIG. 2 is a block diagram of a mobile handset that provides non-volatile RAM service to a near field communication controller.

FIG. 2 is a block diagram of a mobile handset 200 that provides non-volatile RAM service to a near field communication controller 202. Handset 200 includes a baseband processor 206 that typically includes SRAM for holding application software data. A separate non-volatile RAM 207 may be coupled to host processor 206 for holding application software that is executed by processor 206. Cellular modem 208 is coupled to baseband processor 206 and modulates and demodulates data from cellular radio frequency signals sent and received from a cellular network via antenna 209. UICC/SIM 210 is a removable card that is coupled to host processor 206 via a standardized interface, such as ISO 7816. UICC 210 includes a NVRAM 212, generally in the form of flash memory, which may be used to store data such as names, addresses, phone numbers and other info in a phone book format. UICC 210 may also include embedded processor 214 that may execute application software stored in NVRAM 212 or in other read only memory, not shown, within UICC 210. A mobile handset may also include a screen and either an actual or emulated keypad that provides a graphical user interface. Mobile handset 200 is normally powered by battery and power management circuitry 240; however handset 200 may also be powered from an external power source that is connected to power management circuitry 240. The general operation of cellular mobile handsets is well known and will not be described in further detail herein.

As discussed above, mobile handsets are now being configured to emulate credit cards, access cards, bus/transportation tokens, etc. In order to support these applications, an embedded secure element (eSE) 220 may be included within handset 200. eSE 220 includes an embedded processor 224 that may execute application software stored in NVRAM 222 or in other read only memory, not shown, within eSE 220.

In principle, NFC controller 202 operates similarly to contactless device 100. Embedded processor 203 may include simple ROM in which various application programs are stored for execution by embedded processor 203. The NFC Controller's ROM may also include and run the Media Access (MAC) layer of the NFC/contactless protocols as well as handle the interfaces to the NFC Execution Environments (UICC/eSE) which would include and run these various application programs.

However, as described above, in order to reduce cost and size, NFC controller 202 may be fabricated on the same integrated circuit as baseband processor 206 and eSE 220. This integrated circuit may be manufactured in a deep sub-micron CMOS process in which writable non-volatile memory structures are not feasible or very expensive. Therefore, NVRAM 230 that is needed by the NFC controller 202 needs to be separate from the integrated circuit (IC) that contains NFC controller 202.

NFC controller 202 is designed to perform transactions with nearby devices using standardized protocols. An example of such a protocol is ISO/IEC 14443. ISO/IEC 14443 consists of four parts and describes two types of cards: Type A and Type B, both of which communicate via radio at 13.56 MHz. The main differences between these types concern modulation methods, coding schemes (Part 2) and protocol initialization procedures (Part 3). For example, in one protocol, NFC employs two different codings to transfer data. If an active device transfers data at 106 kbit/s, a modified Miller coding with 100% modulation is used. In all other cases Manchester coding is used with a modulation ratio of 10%. Both Type A and Type B cards use the same transmission protocol described in Part 4. The transmission protocol specifies data block exchange and related mechanisms: data block chaining; waiting time extension; multi-activation, etc. There are other types of defined protocols, such as type F, etc.

There are two modes of near field communication: passive communication mode and active communication mode. In passive communication mode, the initiator device provides a carrier field and the target device answers by modulating the existing field. In this mode, the target device may draw its operating power from the initiator-provided electromagnetic field, thus making the target device a transponder. In active communication mode, both initiator and target device communicate by alternately generating their own fields. A device deactivates its RF field while it is waiting for data. In this mode, both devices typically have power supplies. NFC devices are able to receive and transmit data at the same time. Thus, they can check for potential collisions if the received signal frequency does not match with the transmitted signal's frequency.

For each protocol, of a certain (ISO-DEP) type, sixteen or more bytes of NVRAM may be required to identify the application (also known as Application ID or "AID") As discussed above, there may be a number of protocols that need to be supported on a mobile handset in which it is desirable to emulate a large number of credit cards, access cards, transportation cards/token, etc. Therefore, a considerable amount of NVRAM 230 may be needed by NFC controller 202 to keep track of all of the various parameters.

As discussed above, it may not be practical to implement NVRAM on the same IC that contains NFC controller 202. NFC controller 202 is coupled to UICC 210 via an interface 216 such as single wire protocol. Similarly, NFC controller 202 is coupled to eSE 220 via an interface 226 such as single wire protocol. Other embodiments may use a different interconnect protocol for these connections. Rather than providing a separate NVRAM component that is coupled to NFC controller 202, either or both UICC 210 and eSE 220 may execute an NVRAM server app on their respective embedded processors that provides NVRAM service from their respective embedded NVRAMs 212, 222, as indicated by dotted lines 218, 228. In this manner, NVRAM 230 is not a separate component, but is actually located within NVRAM 212, 222.

When mobile handset 200 is turned off, or its battery charge is low or depleted, NFC controller 202 may be powered by resonant inductive coupling via an LC circuit including a capacitor, not shown, and antenna coil 204 that are connected in parallel. When handset 200 is placed in proximity to a card reader, the card reader produces an electromagnetic field that excites the coil and resonant current charges the capacitor, which in turn energizes and powers NFC 202, in a similar manner to the operation of contactless device 100. In this embodiment, the resonant circuit of NFC 202 is capable of producing enough current to power NFC controller 202 and UICC 210 by scavenging power from the electromagnet field when handset 200 is placed in proximity to an external card reader or other reader device. Operation of UICC 210 in low power mode, including processor 214 and NVRAM 212 requires approximately 5 ma. Power sharing circuitry is provided that allows UICC 210 and NFC controller 202 to operate from battery 240 or an external power source that is connected to power management circuitry 240 or from power scavenged from an impinging electromagnetic signal by coil 204 when battery power or external power is not available. Similarly, eSE 220 may be configured to operate in a low power mode using power scavenged from an impinging electromagnetic field when battery power or external power is not available. Therefore, UICC 210 and/or eSE 220 may be able to provide NVRAM service to NFC controller 202 even when the handset battery 240 is turned off, depleted of charge, or even removed from handset 200.

Figure 3:
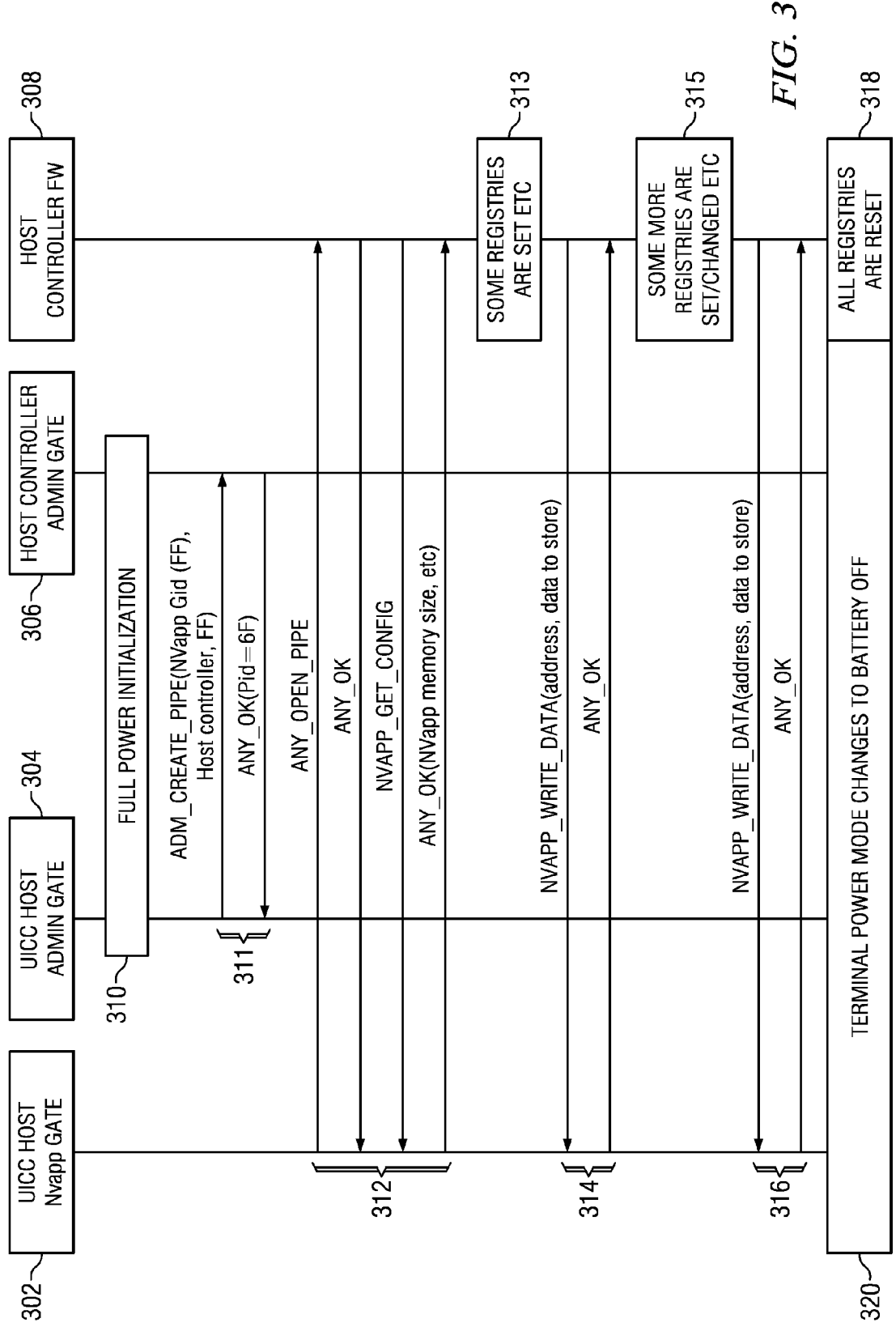
FIGS. 3-6 are flow diagrams illustrating operation of NVRAM serving by a secure element to the NFC controller of FIG. 2.

FIG. 3 is a flow diagram illustrating operation of NFC controller 202 receiving NVRAM service from UICC 210 during periods of adequate battery supply or when connected to an external power supply. In a similar manner, NFC controller 202 may receive NVRAM service from eSE 220. In some embodiments, UICC 210 and eSE 220 both provide NVRAM service to NFC controller 202. In other embodiments, only one or the other of UICC 210, eSE 220 provide NVRAM service.

UICC host NVapp gate 302 and UICC host administration gate 304 are logic modules that may be implemented within UICC 210 by executing software instructions stored within NV memory 212 or other read only memory by embedded processor 214. Host controller administration gate 306 and host controller firmware 308 are logic modules that may be implemented within NFC controller 202 by executing software instructions stored within read only memory by embedded processor 203.

When handset 200 is turned on, an initialization process 310 is performed that assigns 311a unique and static pipe ID, such as 0x67 for example, so that host controller logic 308 will always know what the pipe ID is. Pipes, also know as streams, is a well known technique used to transfer data between a requester device and a target device as a stream of data destined to a selected pipe ID, rather than by doing individual read/write accesses to selected individual memory addresses. This allows the actual memory address of a block of data that is stored on the target device to be masked from the requester device. Pipes operate in a similar manner to message passing, another known technique for transferring data between two devices. A pipe ID is used to define both the target, if there are more than two devices coupled together, and also to define a particular block of data that is of interest. In this embodiment, data is transferred between the NVRAM server in the UICC to the NFC controller over a single wire protocol (SWP) interface. In other embodiments, other types of physical and logical interconnection may be implemented between the NVRAM server and the NFC controller.

As mentioned earlier, initialization process 310 may also include an authentication scheme on power-up events, for example, in order to maintain the secure environment of the embedded security element and/or the UICC.

Using the assigned pipe ID 311, NFC controller firmware 308 may request 312 configuration information for a block of NVRAM that will be served by NVapp 302 on UICC 210 using a get_memory-size( ) API command. NFC controller firmware 308 may receive registry information 313 during a transaction with an external reader and than send 314 the registry information to NVRAM server app 302 for storage on NVRAM 212 within UICC 210 using a write-memory (address, size, data) API command. Additional transactions may occur that produce additional registry information 315 that is likewise sent 316 to the NVRAM server app 302 via the assigned pipe using write_memory API commands. The registry information is also stored in volatile memory within NFC controller 202.

At some point, handset 200 my be turned off 320, either by a user or its battery may run down and power management logic 240 may turn the handset off. Due to this loss of power, all registry information stored within NFC controller 202 is lost 318.

Figure 4:
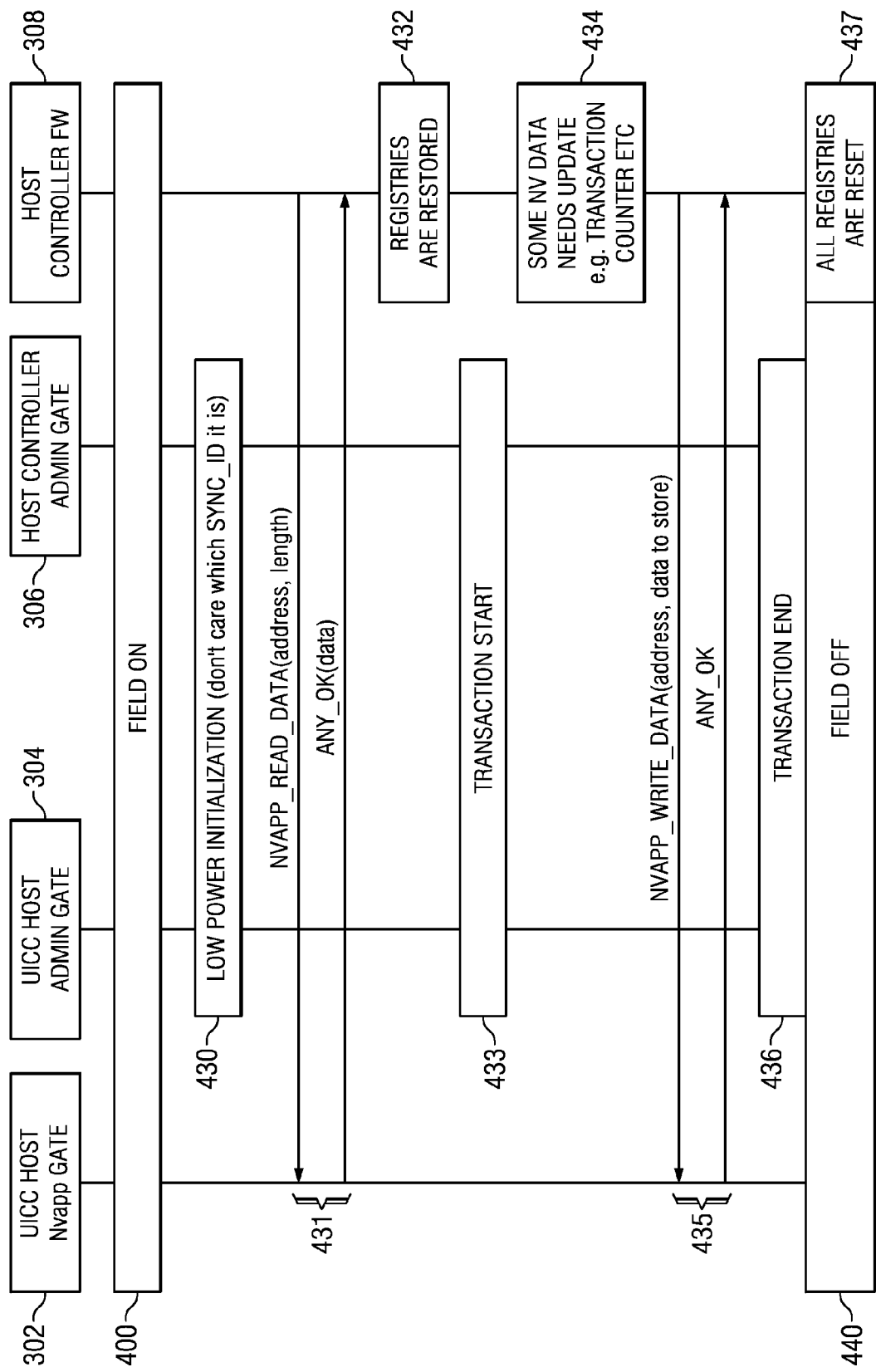

FIG. 4 is a flow diagram illustrating operation of NFC controller 202 receiving NVRAM service from UICC 210 during periods of no battery supply. In a similar manner, NFC controller 202 may receive NVRAM service from eSE 220. Whenever the handset is placed in proximity to an external reader, NFC controller 202 will scavenge power from the impinging electromagnetic field 400, as described above. This allows NFC controller 202 to perform a low power initialization 430. Using the known static pipe ID, NFC firmware 308 requests 431 the lost registry information from NVRAM server 302 using a read_memory(address, length) API command. NVRAM server 302 then provides the requested registry data and NFC controller firmware 308 restores 432 the registry information to volatile RAM within NFC controller 202.

A transaction is then performed 433 in response to the proximate (near by) reader device. The transaction may produce updated registry data 434, such as a transaction count, etc that is stored in the NFC controller's volatile RAM and also sent 435 to the NVRAM server 302 via a write_memory (address, length, data) API command. The transaction may include additional interaction with an application being executed on UICC 210 that emulates a particular credit card, access, transportation token, etc.

When the transaction is completed 436, the proximate reader device may turn off 440 the electromagnetic field and therefore the volatile memory holding the registry data in NFC controller will be reset 437. However, the registry data is preserved by NVRAM server 302.

This sequence of field on, low power initialization, registry restoration from the NVRAM server, transaction, registry update, NVRAM server update and then field off may be repeated a number of times in response to the proximate reader device during the course of a point of sale operation or other type of NFC operation. In some reader implementations, the field may be left on for a longer period of time while several transactions are performed. However, eventually the proximate reader will turn off the field and the NFC controller local registry information will be lost, but the NVRAM server will maintain the registry information that was sent to it by the NFC controller.

In case the UICC was removed from the handset and replaced with a UICC that does not include the NVapp, then an error will be returned to a read_memory command. In case the UICC was removed and replaced with a different UICC that does include an NVapp and the parameter data stored therein is valid, then the NFC controller may continue using the stored registry data in the new UICC card as it is relevant for this UICC configuration.

Figure 5:
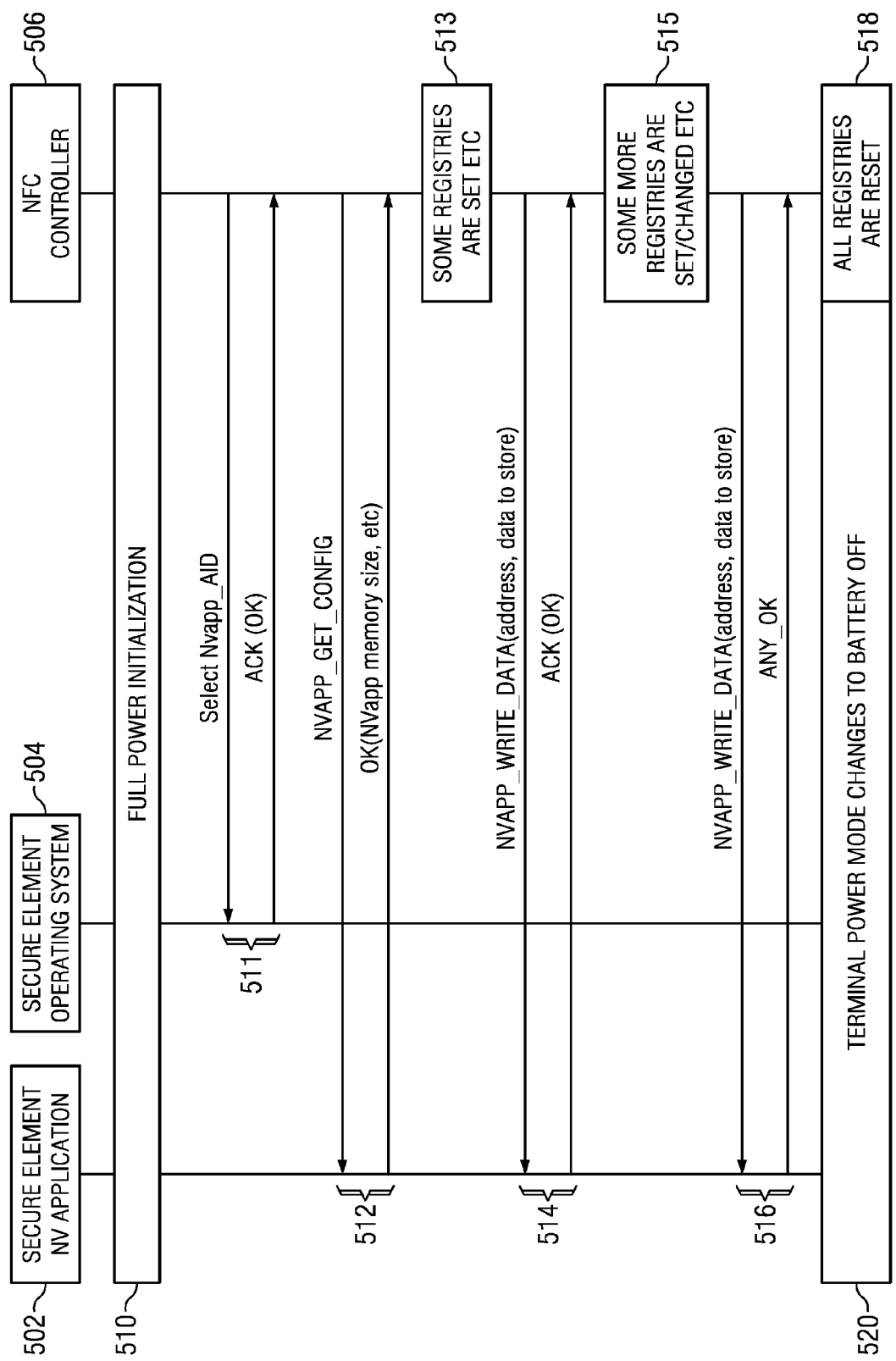
Figure 6:
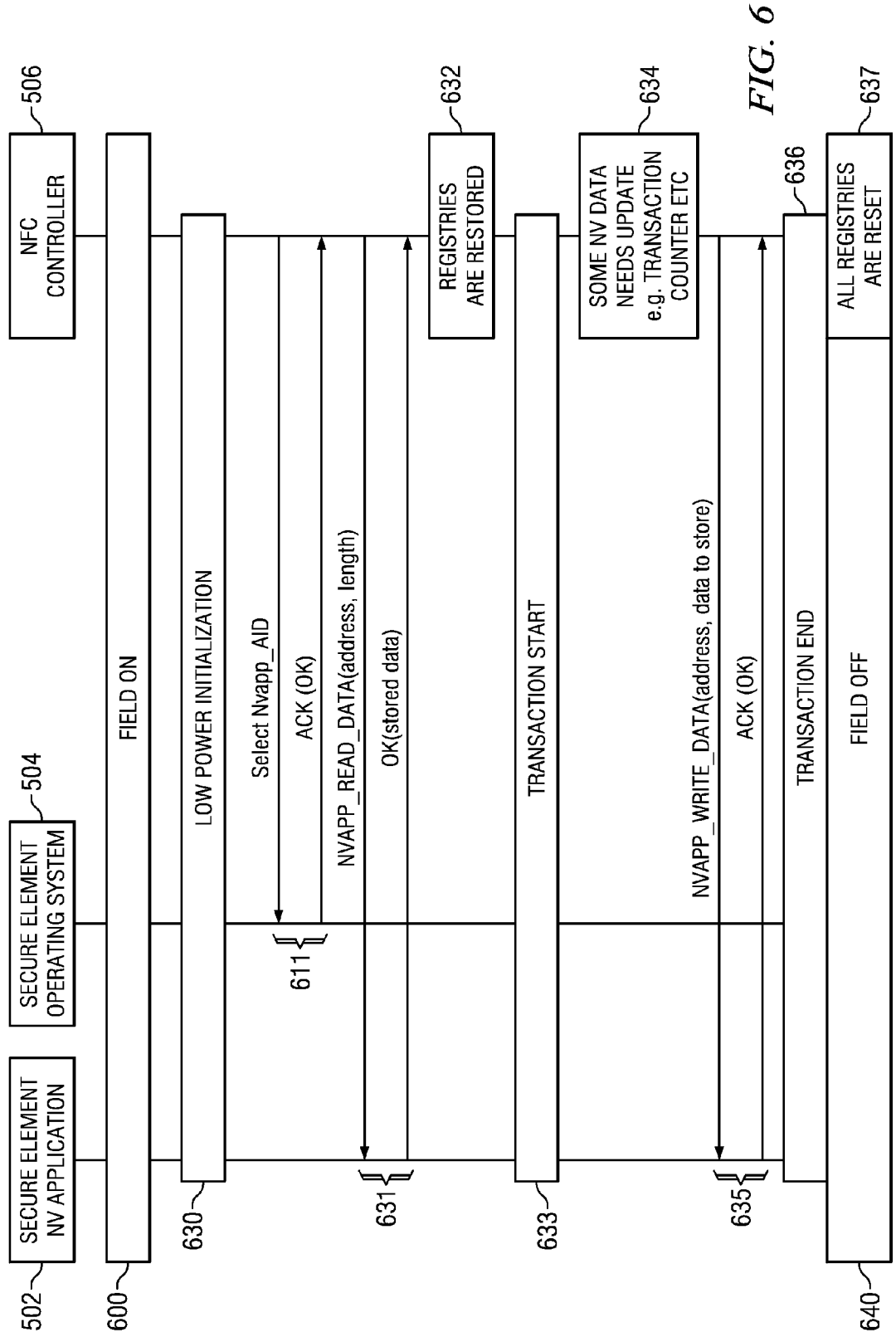

FIGS. 5 and 6 illustrate another embodiment in which a secure element NV application 502 provides NVRAM service to NFC controller 506 within a NFC system. The secure element also includes a secure element operating system (OS) 504. In this embodiment, a communication channel is established between secure element NV application 502 and NFC controller 506 after being initialized 510 by selecting a non-volatile application ID (AID) 511 from secure element OS 504. Once the AID is acknowledged by secure element OS 504, NFC controller 506 may request NVRAM service in a similar manner as described above.

For example, NFC controller 506 may request 512 configuration information for a block of NVRAM that will be served by NVapp 502 on the secure element using a get_confiuration( ) API command. NFC controller 506 may receive registry information 513 during a transaction with an external reader and than send 514 the registry information to NVRAM server app 502 for storage on a NVRAM within the secure element using a write-memory(address, size, data) API command. Additional transactions may occur that produce additional registry information 515 that is likewise sent 516 to the NVRAM server app 502 via the communication channel using write_memory API commands. The registry information is also stored in volatile memory within NFC controller 506.

At some point, the system may be turned off 520, either by a user or its battery may run down and power management logic may turn the system off. Due to this loss of power, all registry information stored within NFC controller 506 is lost 518.

FIG. 6 is a flow diagram illustrating operation of NFC controller 506 receiving NVRAM service from NV app 502 during periods of no or low battery supply. Whenever the system is placed in proximity to an external reader, NFC controller 506 will scavenge power from the impinging electromagnetic field 600, as described above. This allows NFC controller 506 to perform a low power initialization 630. Communication between NFC controller 506 and secure element NV app 502 is again established by selecting 611 the NV app ID from secure element OS 504. NFC controller 506 may then request 631 the lost registry information from NVRAM server 502 using a read_memory(address, length) API command. NVRAM server 502 then provides the requested registry data and NFC controller 506 restores 632 the registry information to volatile RAM within NFC controller 506.

A transaction is then performed 633 in response to the proximate reader device. The transaction may produce updated registry data 634, such as a transaction count, etc that is stored in the NFC controller's volatile RAM and also sent 635 to the NVRAM server 502 via a write_memory(address, length, data) API command. The transaction may include additional interaction with an application being executed on the secure element that emulates a particular credit card, access, transportation token, etc.

When the transaction is completed 636, the proximate reader device may turn off 640 the electromagnetic field and therefore the volatile memory holding the registry data in NFC controller 506 will be reset 637. However, the registry data is preserved by NVRAM server 502.

Figure 7:
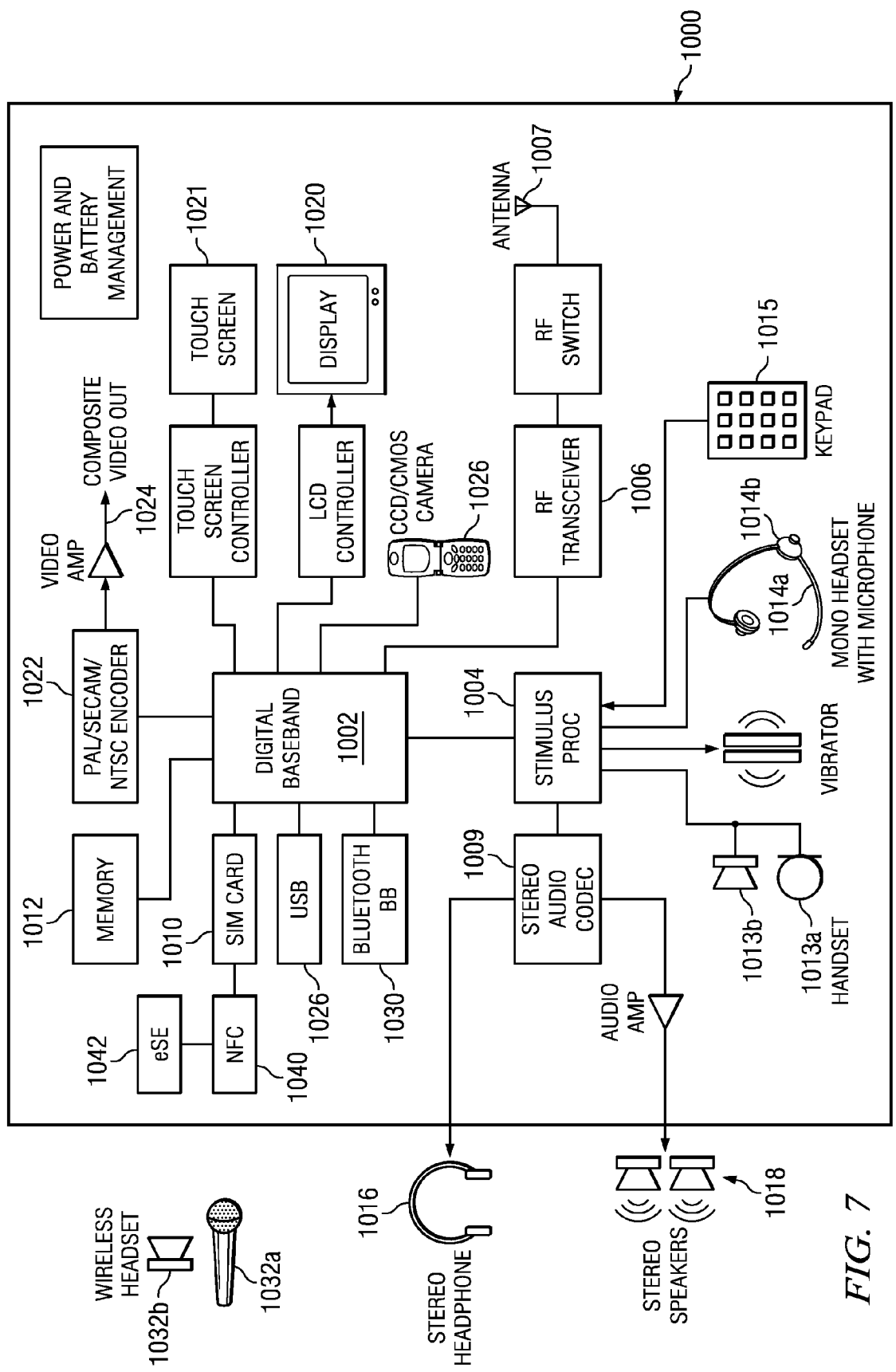
FIG. 7 is a more detailed block diagram of a mobile handset that provides non-volatile service to a near field communication controller.

FIG. 7 is a more detailed block diagram of a representative mobile handset 1000 that provides non-volatile service to a near field communication controller. Digital baseband (DBB) unit 1002 may include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

NFC controller 1040 may be implemented within the same IC as baseband processor 1002 and manufactured using a deep sub-micron CMOS process that does not provide embedded NVRAM. SIM card 1010 and/or embedded security element 1042 may provide NVRAM service to NFC controller 1040 as described in more detail above. In this manner, NFC controller may operate on a separate power domain within the IC so that it can be operated by power scavenged from an impinging electromagnetic field from a proximate reader device. SIM card 1010 and/or eSE 1043 may also be operated by the scavenged power and thereby provide NVRAM service to NFC controller 1040.

Other Embodiments

While the invention has been described with reference to illustrative embodiments, this description is not intended to be construed in a limiting sense. Various other embodiments of the invention will be apparent to persons skilled in the art upon reference to this description. For example, while a mobile handset 200 and 1000 were descried herein, other types and configurations of mobile handsets may embody an NVRAM server for use by a contactless communication system as described herein. Other portable, or mobile systems such as data tablets, personal digital assistants, portable computers, game handsets, remote controls, access badges and fobs, smart credit/debit cards and emulators, and any other now known or later developed systems may embody an NVRAM server for use by a contactless communication system as described herein.

Furthermore, various fixed systems that perform contactless communication, such as card readers, access systems, transportation ticketing systems, etc may embody an NVRAM server for use by a contactless communication system as described herein.

While an NVRAM server was described herein that responds to API commands using a pipe or stream protocol, other embodiments may use a message passing protocol, or other now known or later developed techniques for exchanging data packets between two coupled devices.

While an interconnection between the NFC controller and the NVRAM server (eSE or UICC) has been described herein as being based on the standardized Single Wire Protocol, other embodiments may use a different interconnect mechanism, such as a USB, multiple parallel signals, etc., as long as low power operation can be performed to allow transfer of data between the NFC controller and the NVRAM server module.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the preceding discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A system for near field communication, the system comprising:
   a server module within a first integrated circuit comprising an embedded processor coupled to a non-volatile memory, wherein the server module is configured to provide non-volatile storage service in response to a command protocol; and
   a near field communication (NFC) controller within a separate second integrated circuit comprising another embedded processor coupled to the server module, wherein the NFC controller is configured to pass commands conforming to the command protocol to the server module to request non-volatile storage service, and wherein all read and write operations to writable non-volatile memory initiated by the NFC controller embedded processor are served by the server module.

2. The system of claim 1, wherein the server module is configured to perform a primary function in addition to providing non-volatile storage service.

3. The system of claim 1, wherein the NFC controller and the server module are coupled via only a single signal line for command passing.

4. The system of claim 1, wherein the system is a mobile handset, and wherein the server module is a universal integrated circuit card (UICC).

5. The system of claim 1, wherein the server module is an embedded security element.

6. The system of claim 1, wherein the system is a mobile handset.

7. The system of claim 1, wherein the NFC controller comprises:
   a volatile memory circuit and a read only memory circuit coupled to the embedded processor;
   an inductive loop coupled to a charge storage circuit, wherein the inductive loop is configured to store an electrical charge in the charge storage circuit in response to an electromagnetic field provided by a proximate reader device; and
   wherein the NFC controller and the server module are configured to operate using current derived from the charge storage circuit.

8. The system of claim 7, wherein while the NFC controller and the server module are operating using the current from the charge storage circuit, the NFC controller is configured to perform a sequence of tasks comprising:
   sending a command to the server module to retrieve parameters previously stored within the non-volatile memory of the server module;
   performing a transaction with the proximate reader device using near field communication;
   collecting new parameter values during the transaction; and
   sending a command to the server module to store the new parameter data within the non-volatile memory of the server module.

9. A method for operating a contactless system, the method comprising:
   scavenging energy from an electromagnetic field provided by a proximate reader device by storing an electrical charge in a charge storage circuit;
   operating an embedded processor and a volatile memory circuit within a near field communication (NFC) controller in a first integrated circuit$_{13}$ on the scavenged energy;
   acquiring parameter data from the proximate reader device while conducting a near field communication transaction with the proximate reader device;
   operating a non-volatile memory (NVRAM) server located in a separate second integrated circuit coupled to the NFC controller on the scavenged energy;

storing the parameter data within the NVRAM server by sending a command and the parameter data from the NFC controller to the NVRAM server, wherein all read and write operations to writable non-volatile memory initiated by the NFC controller are served by the NVRAM server; and ceasing operation and loosing all parameter data stored within the NFC controller.

10. The method of claim 9, further comprising:

scavenging energy again from an electromagnetic field provided by the proximate reader device by storing an electrical charge in the charge storage circuit;

operating the embedded processor and volatile memory circuit within a near field communication (NFC) controller on the scavenged energy;

operating the non-volatile memory (NVRAM) server coupled to the NFC controller on the scavenged energy;

retrieving the parameter data from the NVRAM server by sending a command from the NFC controller to the NVRAM server; and storing the retrieved parameter data in the volatile memory of the NFC controller.

11. The method of claim 10, further comprising conducting a near field communication transaction with the proximate reader device using the retrieved parameter data.

12. The method of claim 9, wherein the NVRAM server is a universal integrated circuit card (UICC).

13. The method of claim 9, wherein the NVRAM server is an embedded security element.

* * * * *